COMPOSITE DIELECTRIC BODY CONTAINING AN INTEGRAL
REGION HAVING A DIFFERENT DIELECTRIC CONSTANT
Original Filed Sept. 29, 1966

INVENTORS
David R. Sivertsen
Olin B. Cecil
Rolf R. Haberecht

BY John E. Vandigriff
ATTORNEY

United States Patent Office 3,565,807

Patented Feb. 23, 1971

3,565,807

COMPOSITE DIELECTRIC BODY CONTAINING AN INTEGRAL REGION HAVING A DIFFERENT DIELECTRIC CONSTANT

David R. Sivertsen, Dallas, and Olin B. Cecil and Rolf R. Haberecht, Richardson, Tex., assignors to Texas Instruments Incorporated, Dallas, Tex., a corporation of Delaware Original application Sept. 29, 1966, Ser. No. 588,663. Divided and this application Jan. 16, 1969, Ser. No. 810,428

Int. Cl. B01j *1/10;* H01b *3/12*

U.S. Cl. 252—63.5 5 Claims

ABSTRACT OF THE DISCLOSURE

In the fabrication of microelectronic circuitry, a capacitive device is fabricated comprising a dielectric matrix that includes a discrete region autogenously formed therein having a dielectric constant that differs from that of the matrix.

This is a division of copending application Ser. No. 588,663 filed Sept. 29, 1966, now abandoned.

The present invention relates to a composite dielectric body and to the methods of making such a body.

More specifically, it relates to such a body which has a dielectric matrix and a dielectric region carried by and integral with the matrix. The dielectric region has a different dielectric constant from that of the matrix and is autogenously formed from the material of the matrix by a concentrated energy source, such as an electron beam.

Current emphasis in the art of circuitry is on miniaturization. In recent years a variety of miniaturized circuits have been made or proposed which utilize so-called integrated circuits and hybrid circuits. Typically, such circuits are carried by or formed in a single substrate or chip. While certain components or devices have been successfully provided for such a substrate, particular difficulty has been encountered in capacitive members. In general, the problem has stemmed from the substrate having inappropriate dielectric properties to provide a dielectric region of desired dielectric constant.

It has now been found that a dielectric substrate may be exposed to an electron beam in desired regions to alter the properties of that region in such a way that the dielectric constant of the region is changed. Utilizing this technique, composite dielectric bodies may be made in which a dielectric substrate carries a dielectric region which has a substantially different dielectric constant from that of the substrate. The dielectric region is integral with the substrate and is in intimate contact with it. Accordingly, the substrate, in effect, provides a dielectric matrix supporting the dielectric region. The dielectric region may be made of any desired size, including extremely small sizes, and it may be of a predetermined geometry to coincide with the specific needs of the particular circuit in which it is to be utilized.

From the foregoing, it will be appreciated that the principal object of the present inventon is to provide a composite body which includes a dielectric substrate having a dielectric region of desired dielectric properties, and particularly having a desired dielectric constant.

A further object is to provide such a structure which can be microminiaturized and thus has utility in small integrated circuits and hybrid circuits.

Yet a further object is to provide a simple method of making such structure.

A further object is to provide such a method whereby capacitive members having predetermined desired characteristics may be made in a small dielectric substrate.

It is believed that the nature of the present invention will be better understood after a brief review of certain other inventions owned by the assignee of the present invention. Copending U.S. patent application Ser. No. 398,480, filed Sept. 18, 1964, now Pat. No. 3,390,012, entitled, "Dielectric Bodies With Selectively Formed Conductive or Metallic Portions, Composites Thereof With Semiconductor Material, and Methods of Making Said Bodies and Composites," assigned to the assignee of the present invention, describes methods of forming conductive zones on a dielectric body. In accordance with the invention of the prior application, dielectric bodies having autogenously formed conductive or metallic portions are provided. The making of such bodies depends upon selective reduction of dielectric material to form the metallic or conductive portions. Specifically, in accordance with the prior invention, it was found that bodies of yttrium iron garnet could be selectively reduced by a concentrated energy source in such a manner that preselected regions of a body became changed in chemical structure sufficiently to make such regions relatively metallic and conductive. Moreover, it was observed that the variation of the magnetic properties of such material could be effected by selective reduction. It was further found that spinels, hexagonal iron oxides, and perovskite-type materials could be changed in like manner to yttrium iron garnet by localized reduction to form relatively conductive and metallic regions, as well as to change the magnetic properties of the material in such regions.

Copending U.S. patent application Ser. No. 422,584, filed Dec. 31, 1964, now abandoned, entitled, "Transition Metal Oxide Bodies Having Selectively Formed Conductive or Metallic Portions and Methods of Making Same," assigned to the assignee of the present invention, was an improvement of the invention of U.S. patent application Ser. No. 398,480. Such improvement involved the use of a concentrated energy source to form relatively conductive regions in transition metal oxides. Copending U.S. patent application Ser. No. 422,600, filed Dec. 31, 1964, now Pat. No. 3,296,359, entitled, "Dielectrics With Metalized or Conductive Portions, and Method and Apparatus Related to Making Same," assigned to the assignee of the present invention, applied electron beam techniques to the forming of conductive portions in magnesium oxide and magnesium silicate bodies.

A technique utilized in each of the prior applications mentioned above involves the use of a concentrated energy source, for example, an electron beam, to treat a dielectric substrate. The present invention also makes use of a concentrated energy source, but it utilizes that source to form non-conductive regions in a dielectric substrate. Thus, in accordance with the present invention, a dielectric substrate is exposed to an electron beam in a preselected region to vary the dielectric constant of that region. After treatment, the treated region remains a nonconductor, i.e., its conductivity is in a range where it can hardly be measured and is meaningless.

In accordance with the present invention, a method is provided for altering the dielectric constant of a dielectric body, which comprises bombarding a region of the body with an electron beam. The region of the body is exposed to the beam for sufficient duration until the dielectric constant of the region is altered, but exposure is terminated before the region becomes conductive. Preferably, the dielectric body is made of a monocrystalline material. In a preferred embodiment, the monocrystalline material is anisotropic. Single crystal aluminum oxide is a preferred material.

The structure provided by the present invention is a composite dielectric body comprising a dielectric matrix and a region carried by and integral with the matrix. The region has a different dielectric constant from that of the matrix, and the region is autogenously formed from the material of the dielectric matrix. If a conductive plate means is provided in an appropriate location for such a body, the body may be used to provide a capacitive member for a circuit.

For a more complete understanding of the present invention and for further objects and advantages thereof, reference may now be had to the following description taken in conjunction with the accompanying drawings in which.

Figure 1:
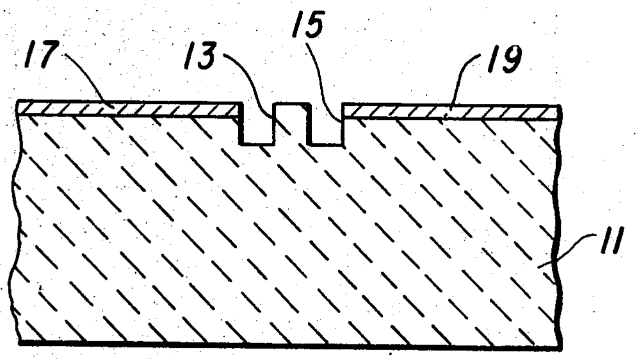
FIG. 1 is a schematic fragmentary, elevational sectional view through a substrate being processed to provide a capacitor therein.

Referring now to FIG. 1, therein is illustrated a dielectric substrate 11, which has a pair of small depressions 13 and 15 extending downward into its body from its upper surface. These depressions may be formed with a variety of desired means, but it is preferred that they be drilled with an electron beam since an electron beam is capable of giving a high degree of resolution and may be controlled to precisely form the depressions of desired configuration in a desired predetermined location.

The spacing between the depressions 13 and 15 may vary over a wide range, but in most instances it is desirable that they be rather close together. For example, the spacing between the depressions may be on the order of one-tenth mil.

Conductive paths 17 and 19 extend across the body 11 to terminate at depressions 13 and 15, respectively. These paths may be formed by joining metal to the upper surface of body 11 by various means known in the art. An alternate method is to scribe paths of desired geometry, as by use of an electron beam, and thereafter to immerse the body 11 in an electroless plating solution and selectively electrolessly plate metal to the scribed paths to form the conductive paths 17 and 19. Detail is given on this technique in the copending applications previously referred to herein.

Figures 2, 3:
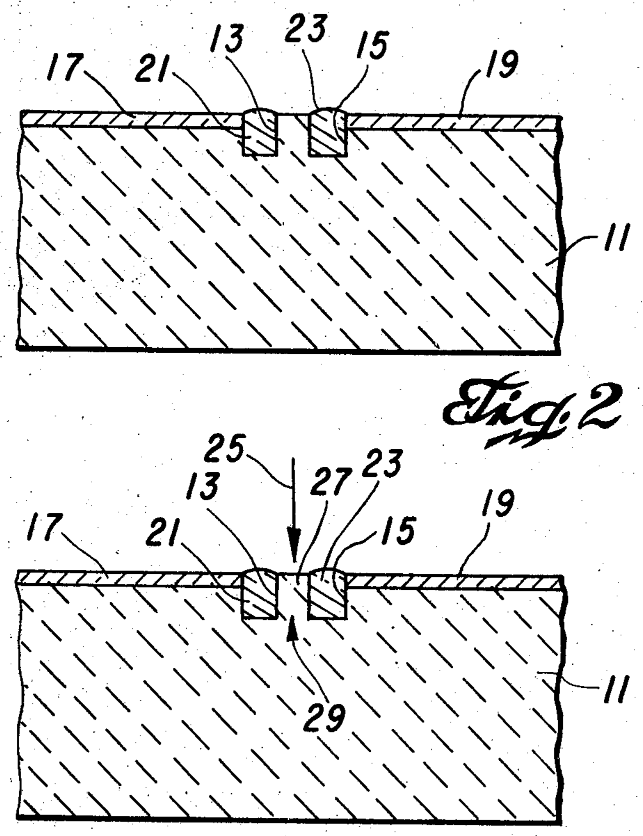
FIG. 2 is like FIG. 1, except it illustrates the structure after a metalizing step has been performed.
FIG. 3 is like FIG. 2, except it illustrates the formation of an altered region in the substrate by bombarding the region with an electron beam.

As illustrated in FIG. 2, metal plates 21 and 23 are formed in the depressions 13 and 15. This may be accomplished by vapor phase deposition of metal (e.g., aluminum) into the depressed regions, or alternatively, when the depressions 13 and 15 have been formed by an electron beam, sufficient metal to provide plates 21 and 23 may be obtained by heavily electrolessly plating these beam-exposed regions. Such plating can be accomplished concurrently with the electroless plating of conductive paths 17 and 19.

After the treatment described in connection with FIG. 2 is completed, the region between plates 21 and 23 is bombarded with an electron beam, schematically illustrated by the arrowhead identified as 25 in FIG. 3. This treatment results in changing the bombarded region of the substrate to form dielectric region 27 which has a different dielectric constant than that of the balance of the material of substrate 11. The dielectric constant obtained can be of different values, depending upon the degree of exposure to the electron beam 25. Accordingly, the exposure of the region to the beam is controlled to yield the desired value of dielectric constant. In any event, it will be appreciated that the degree of exposure is controlled to prevent unacceptable damage to the substrate and is held below an exposure level which would result in making the region 27 conductive.

The end product of the foregoing described treatment is a capacitive device 29, which includes the plates 21 and 23, and the dielectric region 27 of desired dielectric constant. The dielectric region and the plates are both carried in the matrix provided by substrate 11, as are the conductive paths 17 and 19.

The capacity of the capacitor 29 may be adjusted to a wide variety of values, depending upon the degree of beam exposure utilized in forming the dielectric region 27.

In some instances, a capacitive member may be utilized in a circuit in conjunction with only a single conductor. A delay line for microwave transmission circuits is illustrative of such a case. It will be readily seen that the present invention is applicable to formation of this type of structure and it is accordingly deemed to be a capacitive member, within the scope of the present invention.

It is preferred that a monocrystalline material be utilized as the substrate in the practice of the present invention. Moreover, it is preferred that the monocrystalline material have anisotropic properties. Exemplary of such a material is single crystal aluminum oxide, i.e., sapphire. The dielectric constant of monocrystalline aluminum oxide is 10.55 with the field being taken parallel to the optical axis, and 8.6 with the field being taken perpendicular to the optical axis.

The following example illustrates how monocrystalline aluminum oxide may be varied in dielectric constant to values intermediate 10.55 and 8.6.

EXAMPLE

A sapphire is exposed to an electron beam by traversing it past the beam in accordance with a desired pattern at a constant rate. The beam energy is maintained at a constant value in accordance with the following conditions:

Beam voltage—120 kev
Beam current—6.1 microamperes (average)
Beam power—243 MW/cm.$^2$
Beam diameter—1.54 mils The speed of traverse was maintained at 13.4 in./min., 8.65 in./min. and 4.13 in./min., respectively, for successive intervals. The resulting dielectric constant in the regions traversed, with the field taken parallel to the optical axis of the substrate, were as follows for the regions exposed to the beam at the respective speeds:

| Traverse speed: | Dielectric constant |
|---|---|
| 13.4 in./min. | 10.2 |
| 8.65 in./min. | 9.5 |
| 4.13 in./min. | 8.7 |

From the foregoing, it is seen that beam exposure altered the dielectric constant of the original material. Moreover, it is seen that degree of exposure determined the extent of variation. However, within the range of exposures of this example, it will be noted that even the lowest value dielectric constant obtained is still higher than the value (8.6) of the sapphire material when the field is taken perpendicular to the optical axis. Accordingly, all values realized in this example, regardless of the variation in exposure, lay between the two extremes of dielectric constant exhibited by the anisotropic monocrystalline aluminum oxide.

It is not known why the foregoing results are obtained, but one possible explanation is that beam energy vaporizes a quantity of $Al_2O_3$ and causes it to react in accordance with the following equation:

$$Al_2O_3 \text{ (liquid)} \rightarrow Al_2O \text{ (gas)} + 20$$

Also, reaction might occur in part in accordance with the following:

$$1/2Al_2O_3 \text{ (liquid)} \rightarrow Al \text{ (gas)} + 3/20$$

From the foregoing, it is seen that the vaporization of $Al_2O_3$ may generate aluminum oxide vapor and/or aluminum vapor, which in turn may condense and diffuse into the lattice of the $Al_2O_3$ to vary dielectric constant.

Another possible theory is that a melting and recrystallization of $Al_2O_3$ in the regions of exposure cause a layer near the surface of the $Al_2O_3$ to be essentially polycrystalline. The result of this melting and recrystallization might then be to produce an averaging effect in the dielectric constant with respect to the two orientations of the crystal.

While single crystalline aluminum oxide is a preferred material for practice of the present invention, other materials may also be utilized. Barium titanate is exemplary of such an additional material.

Although the practice of the present invention was illustrated by the making of a capacitor, it will be apparent that it may be used to make a variety of structures, usable in certain specific circuit applications. For example, it may be used to provide an isolation region or regions within a dielectric body, for use in fabricating a microwave transmission stripline, and for use in making a delay line for a microwave circuit. In some of these instances it may be desirable to provide a region having a dielectric constant that varies along the region. Such a region of variable dielectric constant may be obtained by varying beam exposure as the region is traversed by a beam, as illustrated in connection with the example above. If desired, the rate of traverse may be regularly increased to provide a regular variation, or indeed any predetermined plan of variation of exposure may be followed to provide a region having a desired degree of variation in dielectric constant along the region.

It will be further apparent that essentially any geometry may be selected for an altered region. Moreover, the diameter of the beam may be varied over a wide range to provide relatively wide regions, or to provide very narrow regions of high resolution, as is required for a given case. In some instances, several passes of a beam in adjacent regions may be required, while in others a single pass will suffice.

To summarize, it is seen that the present invention provides a composite body which has a dielectric matrix and a dielectric region carried by and autogenously formed from the material of the matrix. The essential step in forming such a body is exposing a region of a dielectric substrate to a concentrated energy source such as an electron beam to alter that region to change its dielectric constant.

The term "autogenously" as used herein, including the claims, is intended to convey the concept of a region which "originates within or is derived from the same individual" (Webster's Seventh New Collegiate Dictionary), i.e., derived from the item referred to as having portions "autogenously" formed therefrom.

The term "dielectric material" as used herein refers to a material that is substantially nonconductive.

Having described the invention in connection with certain specific embodiments thereof, it is to be understood that certain modifications may now suggest themselves to those skilled in the art and it is intended to cover such modifications as fall within the scope of the appended claims.

What is claimed is:

1. A composite dielectric body comprising:

(a) a dielectric matrix selected from the group consisting of aluminum oxide and barium titanate, and (b) a region carried by and integral with said matrix, said region having a different dielectric constant from said matrix and being autogenously formed from the material of said dielectric matrix.

2. The composite dielectric body of claim 1 in which said matrix is monocrystalline.

3. The composite dielectric body of claim 2 wherein said monocrystalline material is anisotropic.

4. The composite body of claim 1 wherein said matrix is of monocrystalline aluminum oxide.

5. The composite body of claim 1 wherein said matrix is of barium titanate.

References Cited

UNITED STATES PATENTS 2,793,970 5/1957 Jeppson ------------ 264—22X

JOHN T. GOOLKASIAN, Primary Examiner

M. E. McCAMISH, Assistant Examiner

U.S. Cl. X.R.

161—411, 412; 204—157.1; 250—42; 252—520